(12) United States Patent
Seo

(10) Patent No.: US 10,681,528 B2
(45) Date of Patent: Jun. 9, 2020

(54) METHOD FOR DEVICE-TO-DEVICE DIRECT COMMUNICATION IN WIRELESS COMMUNICATION SYSTEM, AND APPARATUS THEREFOR

(71) Applicant: LG ELECTRONICS INC., Seoul (KR)

(72) Inventor: Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/757,963

(22) PCT Filed: Sep. 8, 2016

(86) PCT No.: PCT/KR2016/010119
§ 371 (c)(1),
(2) Date: Mar. 6, 2018

(87) PCT Pub. No.: WO2017/043897
PCT Pub. Date: Mar. 16, 2017

(65) Prior Publication Data
US 2018/0255595 A1 Sep. 6, 2018

Related U.S. Application Data

(60) Provisional application No. 62/216,347, filed on Sep. 9, 2015.

(51) Int. Cl.
*H04W 8/00* (2009.01)
*H04W 4/90* (2018.01)
(Continued)

(52) U.S. Cl.
CPC ............. *H04W 8/005* (2013.01); *H04L 5/003* (2013.01); *H04W 4/40* (2018.02); *H04W 4/90* (2018.02); *H04W 56/00* (2013.01); *H04W 76/14* (2018.02)

(58) Field of Classification Search
CPC ......... H04W 4/40; H04W 4/90; H04W 8/005; H04W 56/00; H04W 76/14; H04L 5/003
See application file for complete search history.

(56) References Cited

U.S. PATENT DOCUMENTS

2012/0087292 A1   4/2012   Grimm et al.
2012/0316768 A1   12/2012  Haran
(Continued)

FOREIGN PATENT DOCUMENTS

EP      2966825       1/2016
WO      2014137170    9/2014
(Continued)

OTHER PUBLICATIONS

PCT International Application No. PCT/KR2016/010119, Written Opinion of the International Searching Authority dated Dec. 26, 2016, 18 pages.

(Continued)

*Primary Examiner* — Kevin C. Harper
(74) *Attorney, Agent, or Firm* — Lee Hong Degerman Kang Waimey

(57) ABSTRACT

A method for device-to-device direct communication in a wireless communication system according to an embodiment of the present invention is performed by a first terminal, and the method comprises the steps of: setting, as a transmission gap period, a candidate time period in which a first message including location information of a second terminal will be periodically received from the second terminal; and periodically receiving the first message from the second terminal within the transmission gap period. A message is not transmitted from the first terminal through a candidate carrier on which the first message is to be received within the transmission gap period.

9 Claims, 13 Drawing Sheets

(51) Int. Cl.
  *H04W 56/00* (2009.01)
  *H04L 5/00* (2006.01)
  *H04W 76/14* (2018.01)
  *H04W 4/40* (2018.01)

(56) References Cited

U.S. PATENT DOCUMENTS

| | | |
|---|---|---|
| 2013/0148637 A1 | 6/2013 | Yang et al. |
| 2015/0146605 A1 | 5/2015 | Rubin et al. |
| 2015/0228195 A1* | 8/2015 | Beaurepaire ......... G08G 1/0962 340/907 |
| 2015/0382173 A1* | 12/2015 | Wang .................... H04W 8/005 370/329 |
| 2016/0044006 A1* | 2/2016 | Luft ...................... H04W 36/22 380/270 |
| 2016/0242065 A1* | 8/2016 | Fukuta ................. H04W 72/04 |

FOREIGN PATENT DOCUMENTS

| | | |
|---|---|---|
| WO | 2015021961 | 2/2015 |
| WO | 2015128134 | 9/2015 |

OTHER PUBLICATIONS

European Patent Office Application Serial No. 16844713.4, Search Report dated Feb. 19, 2019, 10 pages.

\* cited by examiner (a) CONTROL-PLANE PROTOCOL STACK (b) USER-PLANE PROTOCOL STACK (a)

(b)

METHOD FOR DEVICE-TO-DEVICE DIRECT COMMUNICATION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2016/010119, filed on Sep. 8, 2016, which claims the benefit of U.S. Provisional Application No. 62/216,347, filed on Sep. 9, 2015, the contents of which are all hereby incorporated by reference herein in its entirety.

TECHNICAL FIELD

The present invention relates to a wireless communication system, and more particularly, to a method of performing a direct UE-to-UE (user equipment-to-user equipment) communication in a wireless communication system and apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

The technical task of the present invention is to provide a direction communication method between a vehicle UE and a pedestrian UE in a wireless communication system and an operation related to the method.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

The object of the present invention can be achieved by providing a method of performing D2D (device-to-device) communication with a second user equipment by a first user equipment in a wireless communication system, the method comprising: setting a candidate time interval for receiving a first message containing location information of the second user equipment periodically from the second user equipment as a transmission gap interval; and receiving the first message from the second user equipment periodically in the transmission gap interval, wherein in the transmission gap interval, a message transmission from the first user equipment is not performed through a candidate carrier for receiving the first message.

In another aspect of the present invention, the first user equipment and the second user equipment comprise a vehicle user equipment (V-UE) and a pedestrian UE (P-UE), respectively.

In another aspect of the present invention, in the transmission gap interval, the message transmission from the first user equipment is not performed through the candidate carrier and a carrier adjacent to the candidate carrier.

In another aspect of the present invention, the carrier adjacent to the candidate carrier comprises either at least one carrier spaced apart from the candidate carrier by a value equal to or smaller than a specific value or at least one carrier belonging to a same frequency band of the candidate carrier.

In another aspect of the present invention, the transmission gap interval is set based on at least one of location information of the first user equipment and the location information of the second user equipment.

In another aspect of the present invention, a second message from the first user equipment is transmitted through the candidate carrier in the transmission gap interval as well.

In another aspect of the present invention, the second message comprises a message requiring an urgent transmission as the first user equipment detects a dangerous situation.

In another aspect of the present invention, the first message further comprises at least one of information of a reception carrier the second user equipment attempts to receive, information of a reception radio resource the second user equipment attempts to receive, and reception synchronization information of the second user equipment.

In another aspect of the present invention, the method further comprising detecting a dangerous situation of the second user equipment based on the location information of the second user equipment; and if the dangerous situation of the second user equipment is detected, transmitting a warning message to the second user equipment, wherein the warning message is transmitted based on at least one of the information of the reception carrier, the information of the reception radio resource, and the reception synchronization information.

In another aspect of the present invention, the information of the reception radio resource comprises at least one of specific time region information, specific frequency region information, and index information indicating a specific radio resource among a plurality of radio resources.

In another aspect of the present invention, the reception synchronization information comprises information of a specific cell synchronized with the second user equipment or information of a specific GNSS (global navigation satellite system) synchronized with the second user equipment.

In another aspect of the present invention, a method of performing D2D (device-to-device) communication with a second user equipment by a first user equipment in a wireless communication system, the method comprising: receiving information on a reception attempt interval of the second user equipment from a base station; and transmitting a first message containing location information of the first user equipment to the second user equipment in the reception attempt interval of the second user equipment.

In another aspect of the present invention, a transmission parameter related to a message transmission to the second user equipment is different from a transmission parameter related to a message transmission to a third user equipment.

In another aspect of the present invention, each of the first user equipment and the third user equipment comprises a vehicle user equipment (V-UE) and wherein the second user equipment comprises a pedestrian user equipment (P-UE).

In another aspect of the present invention, a first user equipment configured to perform D2D (device-to-device) communication with a second user equipment in a wireless communication system, a user equipment comprising: a radio frequency (RF) unit; and a processor configured to control the RF unit, wherein the processor is further configured to set a candidate time interval for receiving a first message containing location information of the second user equipment periodically from the second user equipment as a transmission gap interval and receive the first message from the second user equipment periodically in the transmission gap interval, wherein in the transmission gap interval, a message transmission from the first user equipment is not performed through a candidate carrier for receiving the first message.

Advantageous Effects

According to one embodiment of the present invention, battery consumption of a pedestrian UE in a wireless communication system is reduced and V2P (vehicle-to-pedestrian) communication is performed more efficiently.

The effects which can be obtained by the present invention are not limited to the above-described effects and other effects which are not described herein will become apparent to those skilled in the art from the following description.

BEST MODE FOR INVENTION

Configuration, action and other features of the present invention can be easily understood by embodiments of the present invention described in the following with reference to the accompanying drawings. The embodiments described in the following are examples of applying the technical features of the present invention to a 3GPP system Although the present specification describes an embodiment of the present invention using the LTE system and the LTE-A system as an example, the embodiment of the present invention is applicable to any communication systems corresponding to the above definition. Moreover, although the present specification describes the embodiment of the present invention with reference to FDD scheme as an example, the embodiment of the present invention is applicable to H-FDD scheme or TDD scheme by being easily modified.

Moreover, a name of a base station can be used as an inclusive term that includes RRH (remove radio head), eNB, TP (transmission point), RP (reception point), a relay and the like.

Figure 1:
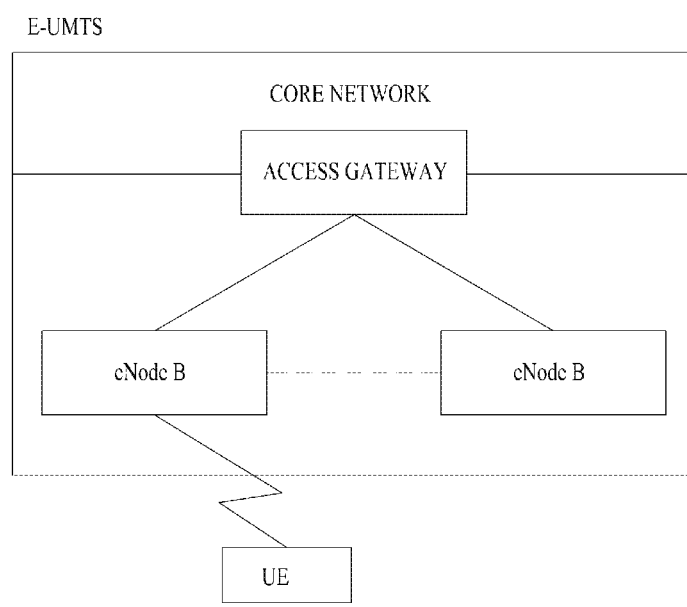
FIG. 1 is a diagram schematically illustrating a network structure of an E-UMTS as an exemplary radio communication system according to an embodiment of the present invention.
Figure 2:
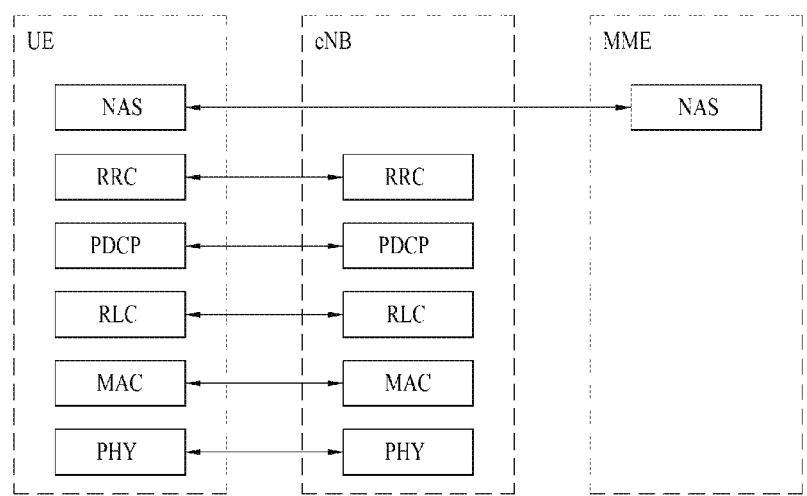
FIG. 2 is a diagram illustrating structures of a control plane and a user plane of a radio interface protocol between a UE and an E-UTRAN based on the 3GPP radio access network specification according to an embodiment of the present invention.
Figure 2:
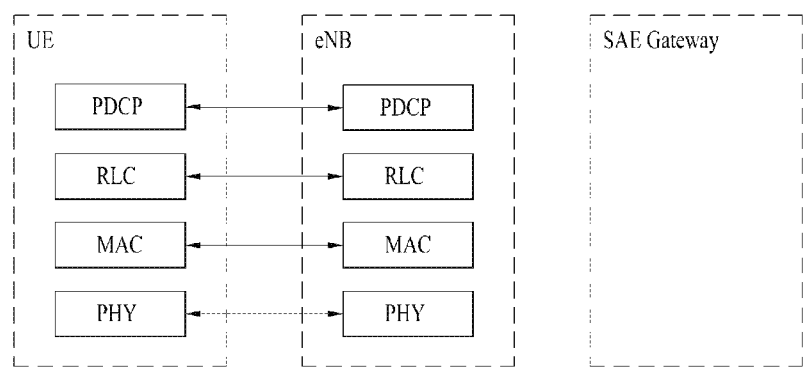

FIG. 2 is a diagram illustrating structures of a control plane and a user plane of a radio interface protocol between a UE and an E-UTRAN based on the 3GPP radio access network specification according to an embodiment of the present invention.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
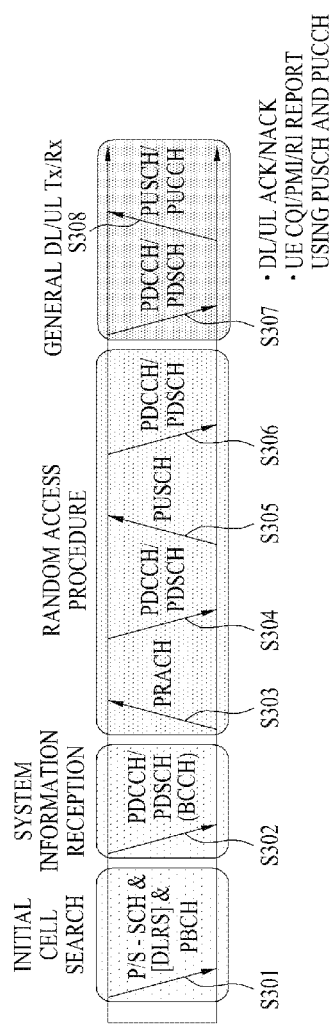
FIG. 3 is a diagram illustrating physical channels used in a 3GPP system and a general signal transmission method using the same according to an embodiment of the present invention.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
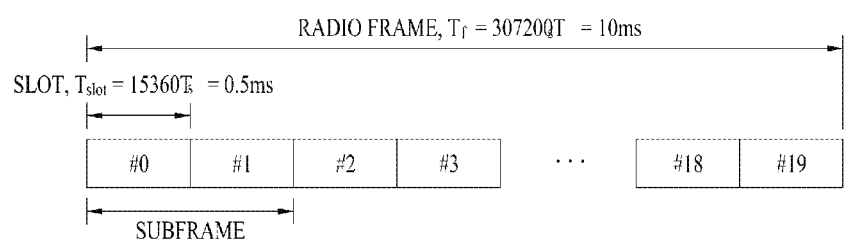
FIG. 4 is a diagram illustrating the structure of a radio frame used in an LTE system according to an embodiment of the present invention.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10−8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
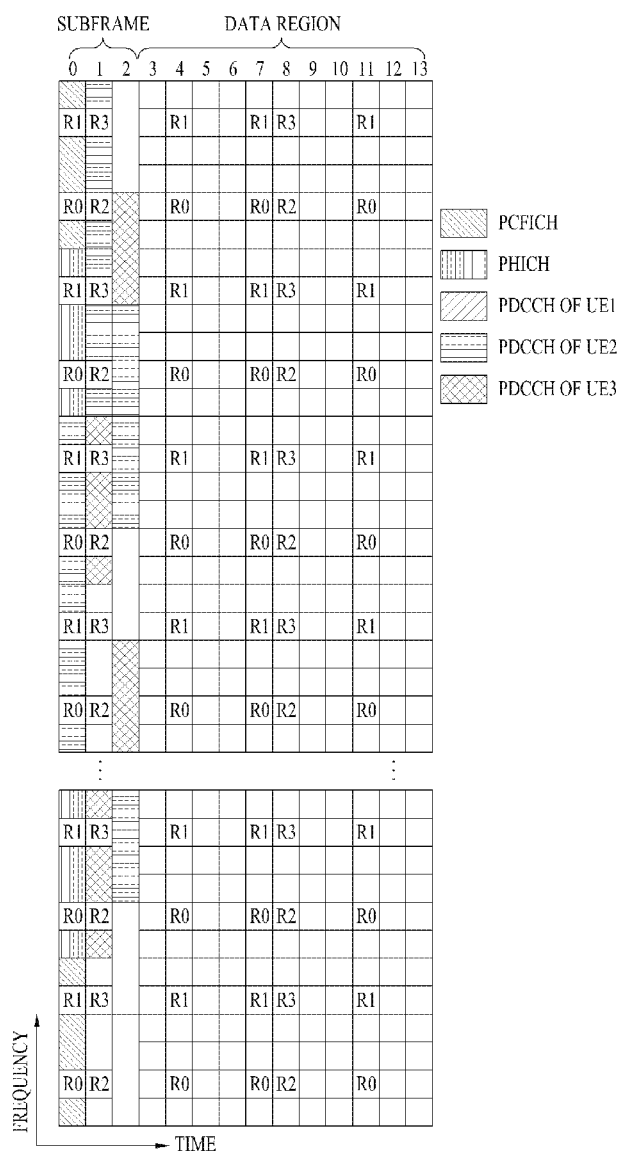
FIG. 5 is a diagram showing the structure of a downlink radio frame used in an LTE system according to an embodiment of the present invention.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
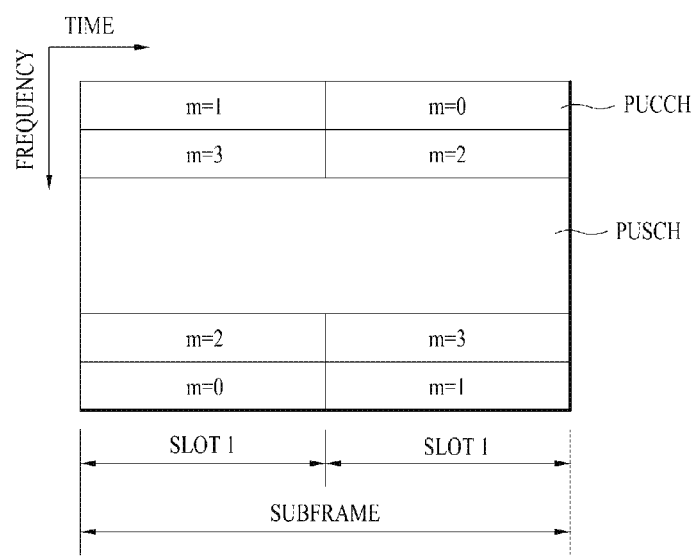
FIG. 6 is a diagram showing the structure of an uplink radio frame used in an LTE system according to an embodiment of the present invention.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, a device-to-device communication is described.

D2D (device-to-device) communication means the communication between an electronic device and an electronic device word for word. In a broad sense, D2D communication means the wired or wireless communication between electronic devices or the communication between a human-controlled device and a machine. Recently, D2D communication generally refers to the wireless communication between an electronic device and an electronic device without human involvement.

According to a D2D or UE-to-UE communication system, UE-to-UE data exchange can be performed without going through a base station. Thus, a link directly established between devices can be named a D2D link or a sidelink. Advantageously, D2D communication has latency smaller than that of an existing base station oriented communication system and requires less radio resources. Here, a UE means a user's terminal. Yet, in case that a network equipment such as an eNB transceives signals like a UE-to-UE communication system, it can be regarded as a sort of a UE. Moreover, it is possible for an eNB to receive a D2D signal transmitted by a UE. Moreover, a UE's signal transceiving method designed for D2D transmission is also applicable to an operation of data transmission from a UE to an eNB.

To perform D2D communication, two UEs should acquire time and frequency synchronization mutually. Generally, if two UEs are located within the coverage of an eNB, the two UEs are synchronized by PSS/SSS, CRS or the like transmitted by an eNB and time/frequency synchronization can be maintained on the level of enabling direct signal transmission/reception between the two UEs.

Meanwhile, a D2D transmission signal transmitted via a sidelink can be mainly classified into a discovery usage or a communication usage. A discovery signal is used to enable a prescribed UE to obtain what kind of UEs a plurality of adjacent UEs are. For example of a sidelink channel for transmission/reception of a discovery signal, there is a physical sidelink discovery channel (PSDCH). A communication signal is a signal that carries general data (e.g., audio or image information, etc.) a UE intends to transmit. For example of a sidelink channel for transmission/reception of a communication signal, there are a physical sidelink broadcast channel (PSBCH), a physical sidelink shared channel (PSSCH), a physical sidelink control channel (PSCCH), etc.

Figure 7:
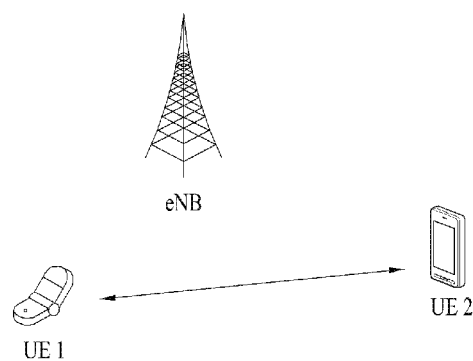
FIG. 7 is a diagram showing examples of UE1 and UE2 performing D2D communication and a D2D resource pool used by them.
Figure 7:
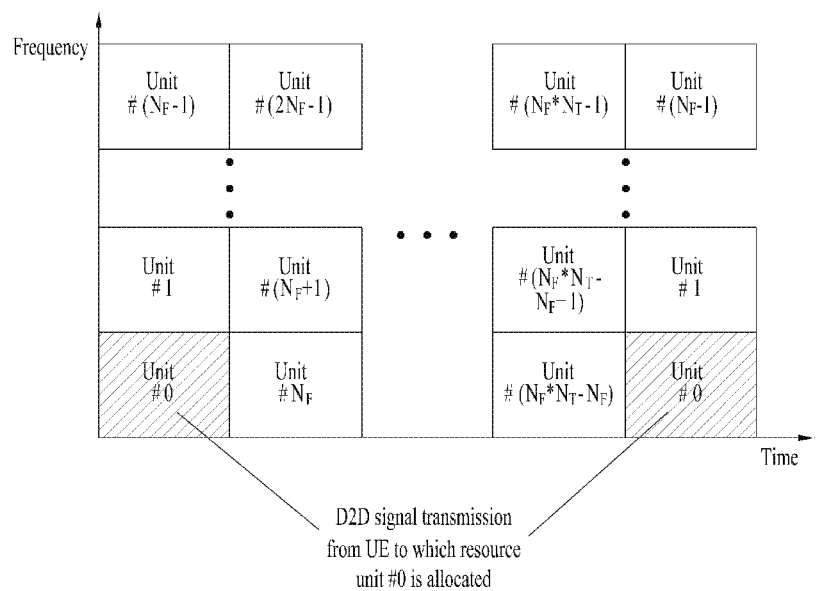

FIG. 7 shows examples of UE1 and UE2 performing D2D communication and a D2D resource pool used by them.

In FIG. 7(a), a UE may mean a network equipment (e.g., a terminal, a base station, etc.) that transceives signals according to a D2D communication system. A transmitting UE (UE1) selects a resource unit corresponding to a specific resource from a resource pool, which means a series of resource sets and is able to transmit a D2D signal using the corresponding resource unit. A resource pool enabling the UE1 to transmit signals is configured for a receiving UE (UE2), and the UE2 can detect a signal of the UE1 from the resource pool. Here, if the UE1 is located in a connectivity range of a base station, it can be informed of the resource pool by the base station. If the UE1 is located out of the connectivity range of the base station, it can be informed of the resource pool by another UE (e.g., UE1) or the resource pol may be determined as a predetermined resource. Generally, a resource pool consists of a plurality of resource units. Each UE can select one or a plurality of resource units from the resource poop and use the selected resource units for D2D signal transmission of its own.

FIG. 7(b) shows one example of a resource unit configuration. Referring to FIG. 7(b), it can be observed that total $N_F*N_T$ resource units are defined by dividing a whole frequency resource and a whole time resource into $N_F$ and $N_T$ subframes, respectively. According to the present embodiment, a corresponding resource pool can be regarded as repeated by periods amounting to $N_T$ subframes. Particularly, a single resource unit can appear in a manner of being repeated periodically (e.g., unit #0). Or, to obtain a diversity effect in a time or frequency dimension, an index of a physical resource unit having a logical resource unit mapped thereto maybe changed into a predetermined pattern according to a time.

In such a resource unit structure, a resource pool may mean a set of resource units that can be used for transmission by a UE intending to transmit a D2D signal.

Meanwhile, a resource pool can be subdivided into several types. A resource pool may be classified by contents of a D2D signal transmitted in each resource pool. For example, contents of a D2D signal can be classified into SA (scheduling assignment), D2D data channel, discovery channel, synchronization channel, etc. And, a separate resource pool can be configured for each of the contents.

The SA may be referred to as a different name such as a D2D control channel or a PSCCH (physical sidelink control channel). The SA may be a signal containing information such as a location of a resource used for transmission of a following D2D data channel by a transmitting UE, MCS (modulation and coding scheme) or MIMO transmission scheme required for data channel demodulation, TA (timing advance), etc. This signal can be transmitted on the same resource unit in a manner of being multiplexed with D2D data. In this case, an SA resource pool may mean a pool of resource transmitted in a manner that SA and D2D data are multiplexed together.

A resource pool for the D2D data channel (or, PSSCH (physical sidelink shared channel)) may mean a pool of a resource designated through the SA, i.e., a resource used by a transmitting UE in transmitting user data. In case that D2D data and SA are transmitted on the same resource unit by being multiplexed together, only D2D data channel of a type except SA information can be transmitted in a resource pool for the D2D channel. So to speak, resource elements (REs) used in transmitting SA information on an individual resource unit in an SA resource pool can be still used to transmit D2D data in a D2D channel resource pool.

A resource pool for the discovery channel (or PSDCH (physical sidelink discovery channel)) may be a resource pool for a message through information such as an ID and the like is transmitted by a transmitting UE to enable an adjacent UE to discover the transmitting UE.

The synchronization channel may be referred to as another name such as a sidelink synchronization signal or a PSBCH (physical sidelink broadcast signal). A resource pool for the synchronization channel may be a resource pool for a signal/channel that achieves the goal for a receiving UE to match time/frequency synchronization with a transmitting UE that transmits a synchronization signal and information related to synchronization.

ON the contrary, even if contents of a D2D signal are the same, a different resource pool may be used depending on transmission/reception attribute of the D2D signal. For example, the same D2D data channel or discovery message can be classified into a different resource pool according to a D2D signal transmission timing determining scheme (e.g., whether the signal is transmitted at a receiving timing of a synchronization reference signal or whether the signal is transmitted by applying a predetermined timing advance (TA) thereat), a resource allocation scheme (e.g., whether an eNB designates a transmission resource of an individual signal to an individual transmitting UE or whether an individual transmitting UE selects an individual transmission resource from a pool by itself), a signal format (e.g., # of symbols occupied in a subframe by each D2D signal, # of subframes used for a transmission of a D2D signal), a signal strength from an eNB, a transmission power strength of D2D UE and the like.

Meanwhile, as a type associated with D2D communication, discussion on V2X (vehicle to everything) communication is in progress. V2X is the concept that includes V2V between vehicle UEs, V2P between a vehicle and a different type UE, and V2I (vehicle-to-infrastructure) between a vehicle and an RSU (roadside unit).

Figure 8:
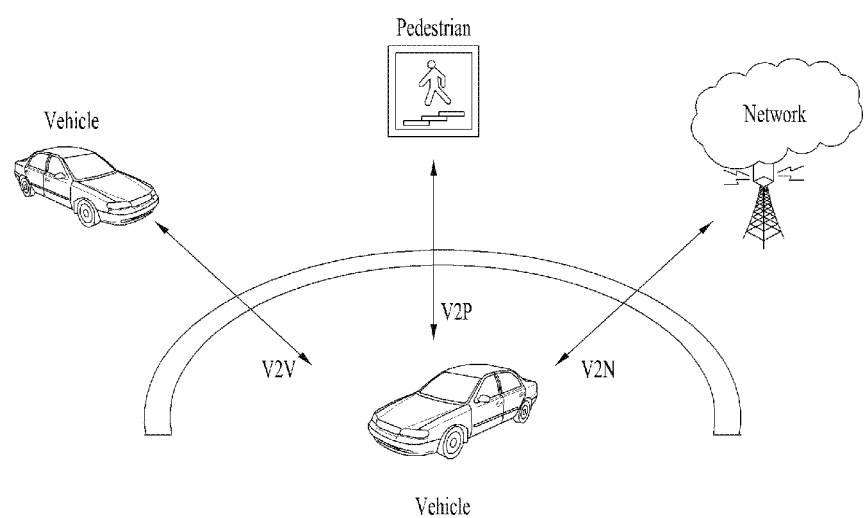
FIG. 8 is a diagram exemplarily showing V2X (vehicle-to-everything) communication environment.

FIG. 8 is a diagram exemplarily showing V2X communication environment.

When a vehicle accident occurs, a vehicle causes life damage and property damage considerably. Hence, the demand for the technology capable of securing pedestrian's safety as well as persons on board on driving a vehicle is increasingly rising. Hence, the vehicle-specialized hardware & software based technology is applied to a vehicle.

V2X (Vehicle-to-everything) communication technology based on LTE starting from 3GPP reflects the trend of applying IT (information technology) to vehicles. Connectivity function is applied to some vehicle types. For the evolution of the connectivity function, ongoing efforts are made to support V2V (Vehicle-to-Vehicle) communication, V2I (Vehicle-to-Infrastructure) communication, V2P (Vehicle-to-Pedestrian) communication, and V2N (Vehicle-to-Network) communication.

According to V2X communication, a vehicle can continuously broadcast information on a location, speed, and direction of its own and the like. Having received the broadcasted information, an ambient vehicle recognizes movements of nearby vehicles and utilizes them for accident prevention.

Namely, in a similar manner that an individual possesses a UE of a smartphone type, a smartwatch type or the like, a UE (user equipment) of a specific type is installed in each vehicle. Here, the UE installed in the vehicle means a device actually provided with a communication service on a communication network. For example, the UE installed in the vehicle can be provided with a communication service by being connected to an eNB.

Meanwhile, the above-described V2X communication can be effectively applied to an operation of detecting a danger in advance by communicating with an ambient UE quickly in a fast moving situation of a car. In the following description, a UE installed in a car shall be named a vehicle UE (V-UE) but a UE directly handheld by a pedestrian or the like shall be named a pedestrian UE (P-UE). Regarding one of differences between the two UE types, the V-UE can be consistently provided with power from a battery installed in a car but the P-UE should use a limited built-in battery only. Hence, in a P-UE communicating environment, it may be very important to reduce battery consumption. Due to such a reason, according to some embodiments, the V-UE consistently observes transmission of a different UE and always performs a sensing operation of selecting a resource unoccupied by the different UE as a transmission resource of the V-UE. Yet, the P-UE can perform an operation of reducing battery consumption by not performing such a sensing operation at all or by performing such a sensing operation in a prescribed limited interval only.

Figure 9:
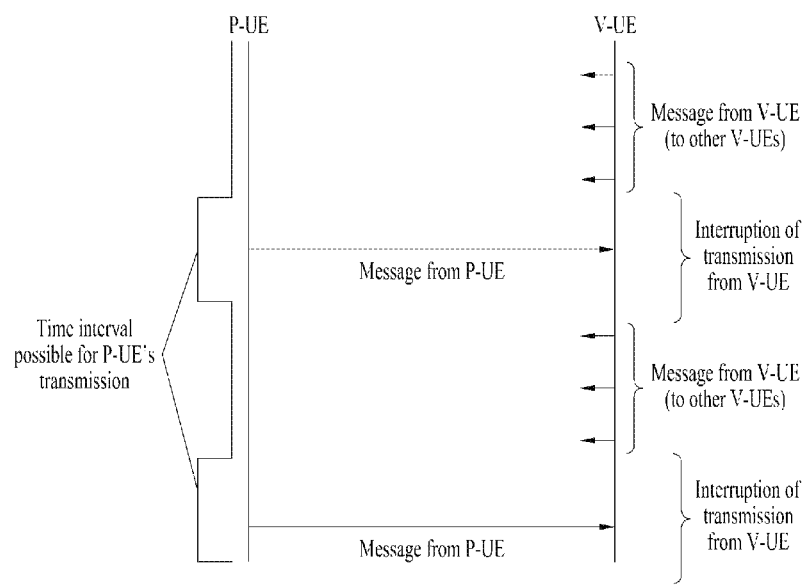
FIG. 9 and FIG. 10 are diagrams exemplarily showing an operation of a pedestrian UE (P-UE) and a vehicle UE (V-UE) performing V2P (vehicle-to-pedestrian) communication according to one embodiment of the present invention.
Figure 10:
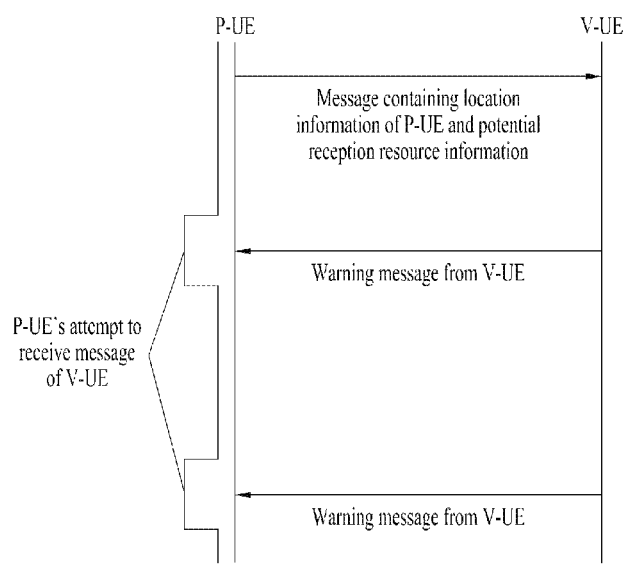
Figure 11:
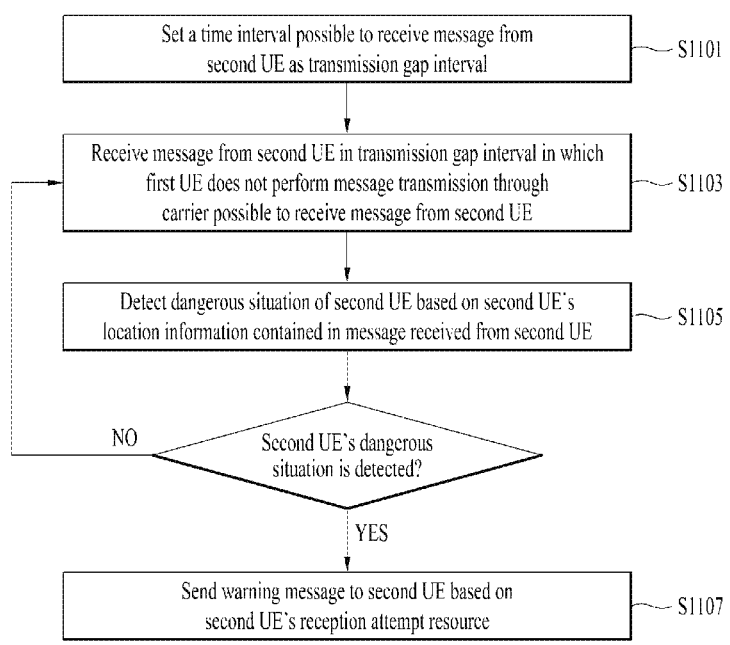
FIG. 11 is a flowchart exemplarily showing a transceiving operation of a first UE according to one embodiment of the present invention.
Figure 12:
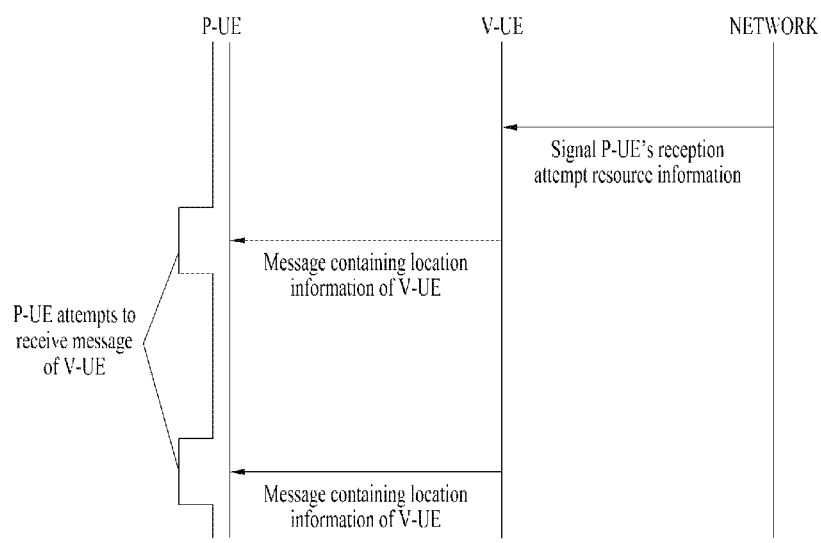
FIG. 12 is a diagram exemplarily showing an operation between a pedestrian UE (P-UE), a vehicle UE (V-UE) and a network, which perform V2P communication, according to one embodiment of the present invention.
Figure 13:
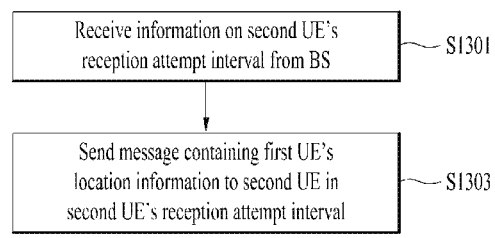
FIG. 13 is a flowchart exemplarily showing a transceiving operation of a first UE according to one embodiment of the present invention.

Therefore, the present invention intends to provide a communication scheme for reducing battery consumption of P-UE in a situation that V-UE and P-UE perform D2D communication (i.e., V2P communication). In the following, described with reference to FIGS. 9 to 11 is a case that P-UE first transmits a signal to V-UE in V2P communication according to embodiments of the present invention. In the following, with reference to FIG. 12 and FIG. 13 is a case that V-UE first transmits a signal to P-UE.

FIG. 9 and FIG. 10 are diagrams exemplarily showing an operation of a pedestrian UE (P-UE) and a vehicle UE (V-UE) performing V2P communication according to one embodiment of the present invention. In FIG. 9 and FIG. 10, a case that a P-UE first transmits a signal (or message) to a V-UE is described.

Referring to FIG. 9, a P-UE can transmit a message containing its location information and the like to ambient UEs (e.g., V-UEs). Yet, in order to reduce battery consumption of the P-UE, a period for the P-UE to transmit the message may be relatively longer than a message transmission period or the like of the V-UE. As a result, a single P-UE transmission should be delivered to V-UEs with high probability. Hence, in a time interval possible for P-UE's transmission (so to speak, a time interval in which the V-UE has possibility of receiving a message from the P-UE) and on a carrier possible for P-UE's transmission or an adjacent carrier (e.g., carrier(s) located by being spaced apart from the corresponding carrier under a predetermined level, carrier(s) belonging to the same frequency band of the corresponding carrier, etc.), the V-UE may pause the message transmission and receive a signal of the P-UE. In other words, in a time interval responding to the P-UE's transmission possible timing, a transmission gap is generated to the V-UE. Namely, in operation aspect of the V-UE, a transmission gap having a period relatively longer than that of the V-UE is generated. In this transmission gap, it may appear that a signal transmission of the V-UE is interrupted. Namely, in the transmission gap, the V-UE does not perform a message transmission to other V-UEs (or, base station, etc.).

According to some embodiments, the V-UE obtains its location and may receive a signal of nearby P-UE(s) only. Hence, a transmission possible timing of the nearby P-UE(s) and a responding transmission gap of the V-UE may be changed depending on the location of the V-UE. This is because the nearby P-UE(s) of the V-UE may be changed according to the location of the V-UE. Namely, if a V-UE belongs to a specific location, a transmission gap is generated at a timing responding to the corresponding location. If the V-UE moves its location, a transmission gap can be generated at a different timing. Of course, such a transmission gap may be limited to a specific signal transmitted from a V-UE. For example, since a V-UE detects possibility of collision with another V-UE or finds an operation error of a car in which the V-UE is installed, if a signal requires an urgent transmission, the signal can be exempted from the application of the transmission gap. In other words, such an urgent signal transmission or the like may be performed within a transmission gap as well. Such a distinction, i.e., whether to determine an exception of the application of the transmission gap can be determined by a priority level assigned to each message. And, a message having a specific priority level may be allowed to be transmitted in the transmission gap interval as well.

Meanwhile, if the V-UE receives the message of the P-UE and determines that the corresponding P-UE is exposed to a dangerous situation on the basis of the P-UE's received message (e.g., determines the corresponding P-UE has high possibility of collision with the V-UE), the V-UE can inform a driver of the determination. Moreover, the V-UE in this situation sends a warning message to the corresponding P-UE, thereby guiding a pedestrian retaining the P-UE to react appropriately. In doing so, in order to reduce power consumption, it is preferable to attempt to receive a D2D signal in a specific time only. Moreover, since it is highly probable that a relatively low cost is required for the implementation of the P-UE, simultaneous reception ability (e.g., on FDD band, ability of receiving a D2D signal on a UL carrier while receiving an eNB signal on a DL carrier) of the P-UE may be possibly limited.

The V-UE preferably sends a warning message to the P-UE by reflecting the limitation put on the P-UE's operation, and FIG. 10 shows a V2P communication operation in consideration of such a fact.

Referring to FIG. 10, a V-UE can send a warning message to a P-UE in a manner of working to a synchronization reference and resource received by the corresponding P-UE.

Particularly, the P-UE can send a message containing its location information and potential reception resource information (i.e., information of a resource attempting a reception of a message from the V-UE) to the V-UE. For example, the message may include at least one of: i) location information of a carrier the P-UE attempts to receive; ii) information of a resource the P-UE attempts to receive; and iii) reception synchronization information of the P-UE.

In some embodiments, the information of the resource the P-UE attempts to receive may appear in a specific time or frequency region for example, or in form of an index of a resource pool the P-UE attempts to receive. Or, it may refer to a time interval (e.g., an interval in which a gap for interrupting WAN (wide area networks) reception is configured) in which an eNB connected to the P-UE allows a D2D signal reception.

In some embodiments, if the P-UE is synchronized with a cell having a specific ID of a specific carrier and receives a D2D signal, the reception synchronization information of the P-UE can contain such information. If the P-UE is synchronized with an external signal such as GNSS (global navigation satellite system), such information may be contained as well.

Meanwhile, if the V-UE receives the message containing such information from the P-UE and detects a danger, the V-UE can send a warning message in a manner of working to a synchronization reference and resource received by the corresponding P-UE.

In the following, the V2P communication operation described with reference to FIG. 9 and FIG. 10 shall be subsidiarily described in aspect of V-UE (i.e., a first UE).

FIG. 11 is a flowchart exemplarily showing a transceiving operation of a first UE according to one embodiment of the present invention. In the description with reference to FIG. 11, a first UE and a second UE may include a vehicle UE (V-UE) and a pedestrian UE (P-UE), respectively.

Referring to FIG. 11, a first UE can set a time interval possible to periodically receive a message from a second UE (i.e., a time interval possible for the second UE to periodically transmit a message) (hereinafter called a candidate time interval) as a transmission gap interval [S1101]. Thus, if the candidate time interval is set as the transmission gap interval, since the candidate time interval and the transmission gap interval indicate the same time interval, the candidate time interval and the transmission gap interval may be the terms compatible with each other in the following description.

After the transmission gap interval has been set, the first UE periodically receives a message from the second UE in the transmission gap interval (i.e., candidate time interval) but may not perform message transmission through a carrier possible to receive a message from the second UE (i.e., a carrier possible for the second UE to transmit a message) (hereinafter called a candidate carrier) [S1103].

Thus, the first UE sets the candidate time interval as the transmission gap interval but does not perform message transmission through the candidate carrier in the transmission gap interval, thereby raising the probability that the first UE successfully receives the message transmitted by the second UE. In some embodiments, the transmission gap interval may be set based on at least one of location information of the first UE and location information of the second UE.

In some embodiments, the first UE may not use a carrier adjacent to the candidate carrier (e.g., carrier(s) spaced apart from the candidate carrier by a value equal to or smaller than a specific value or carrier(s) belonging to the same frequency band of the candidate carrier) for message transmission as well as the candidate carrier. Thus, if a carrier adjacent to the candidate carrier in the transmission gap interval is not used for the transmission of the first UE as well, it may raise the probability that the first UE successfully receives a message transmitted by the second UE.

Meanwhile, as described above, even if the first UE sets the transmission gap interval, a specific message can be exceptionally transmitted irrespective of the transmission gap interval. Namely, the specific message can be transmitted from the first UE through a candidate carrier (or, a candidate carrier and a carrier adjacent thereto) in the transmission gap interval. For example, the specific message may include a message that requires an urgent transmission since the first UE detects a dangerous situation.

Meanwhile, while the first UE periodically receives a message from the second UE, the first UE can detect a dangerous situation of the second UE based on the second UE's location information contained in the message received from the second UE [S1105]. Accordingly, if the dangerous situation of the second UE is detected, the first UE can send a warning message to the second UE [S1107]. In order to raise the probability that the second UE successfully receives the warning message, the warning message can be sent based on a reception attempt resource of the second UE. Particularly, the warning message can be sent to the second UE based on at least one of: i) information of a reception carrier the second UE attempts to receive; ii) information of a reception radio resource the second UE attempts to receive; and iii) reception synchronization information of the second UE. The reception relevant informations of the second UE may be contained in the message received from the second UE by the first UE in the step S1103.

In some embodiments, information of the reception radio resource may include at least one of specific time region information, specific frequency region information, and index information indicating a specific radio resource among a plurality of radio resources. The reception synchronization information may include information of a specific cell synchronized with the second UE or information of a specific GNSS (global navigation satellite system) synchronized with the second UE.

FIG. 12 is a diagram exemplarily showing an operation between a pedestrian UE (P-UE), a vehicle UE (V-UE) and a network, which perform V2P communication, according to one embodiment of the present invention. Described in FIG. 12 is a case that a V-UE first sends a signal (or message) to a P-UE.

Referring to FIG. 12, a V-UE sends a message containing its location information and the like to a P-UE. Having received the message, the P-UE can obtain collision danger and the like. Namely, according to the embodiments described with reference to FIGS. 9 to 11, the P-UE periodically sends the message containing its location information and the like to the ambient V-UEs. Yet, according to the present embodiment, the V-UE first sends the message.

Basically, a V-UE's message transmitting method and a P-UE's message receiving method in the present embodiment may be similar to the V-UE's (warning) message transmitting method and the P-UE's (warning) message receiving method described with reference to FIG. 10. Namely, the P-UE attempts a reception of a V-UE signal at a specific timing only and the V-UE can transmit a necessary signal in a manner of working to it.

Yet, since information on a P-UE's reception attempt timing and the like is not delivered to the V-UE from the P-UE in the present embodiment, i) location information of a carrier the P-UE attempts to receive, ii) information of a resource the P-UE attempts to receive, iii) reception synchronization information of the P-UE and the like can be delivered to the V-UE through separate signaling such as signaling via network.

In a manner similar to the former description with reference to FIGS. 9 to 11, a timing for the P-UE to attempt to receive a signal of the V-UE may differ depending on a location of the P-UE. Namely, the V-UE can perform a message transmission by targeting the P-UE at a timing responding to a location of the V-UE (or, a location of the P-UE within the coverage of the V-UE).

Meanwhile, the V-UE transmission at such a timing (i.e., a timing of a P-UE targeted transmission) may be different from a different V-UE transmission (e.g. a transmission targeting other V-UEs) in transmission attributes. For such a reason, when a reception target is the V-UE, since the V-UE consistently receives signals, although reliability of one transmission is low, if the V-UE receives a subsequently transmitted message, it causes no problem. Hence, in order to prevent excessive interference between V-UEs, it is preferable to reduce transmission power, repetitive transmission count, a quantity of time/frequency resource used for transmission, and the like. Yet, when a reception target is the P-UE, since a next reception opportunity appears late, a reception should be successful at a time. Hence, regarding a transmission targeting the P-UE at a specific timing, it is preferable to raise transmission power, repetitive transmission count, and a quantity of time/frequency resource used for transmission.

A network can set different transmission parameters for the two cases, respectively. Or, the V-UE determines a load of a channel by itself and is then able to adjust a transmission parameter. Namely, the V-UE can differently manage an adjustment scheme between a P-UE targeted transmission and a V-UE targeted transmission (e.g., manage a transmission parameter applied to the same load differently).

Meanwhile, in some cases, a P-UE can send a warning message to an adjacent V-UE. In doing so, in a manner similar to the aforementioned V-UE's message transmitting method, information on a reception resource of the V-UE and the like is contained in the V-UE message transmitted to the P-UE. Having received the V-UE message, the P-UE can send a warning message in a manner working to a resource the corresponding V-UE attempts to receive.

In the following, the V2P communication operation described with reference to FIG. 12 is subsidiarily described in aspect of a V-UE (i.e., a first UE).

FIG. 13 is a flowchart exemplarily showing a transceiving operation of a first UE according to one embodiment of the present invention. In the description with reference to FIG. 13, a first UE and a second UE may include a vehicle UE (V-UE) and a pedestrian UE (P-UE), respectively.

Referring to FIG. 13, a first UE can receive information on a reception attempt interval of a second UE [S1301]. Unlike the former cases described with reference to FIGS. 9 to 11, since the first UE first sends a message to the second UE in the present embodiment, the information on the reception attempt interval of the second UE can be received by separate signaling from a base station.

Thereafter, the first UE can send a first message containing location information of the fist UE to the second UE in the reception attempt interval of the second UE [S1303].

Thus, when the first UE sends a message in the reception attempt interval of the second UE, despite the limitations put on the power consumption and/or reception capability of the second UE, it is able to raise the probability that the second UE successfully receives the message from the first UE.

Meanwhile, as described above, since the case that the reception target is the V-UE and the case that the reception target is the P-UE may differ from each other in transmission attributes, transmission parameters related to the message transmission from the first UE (e.g., V-UE) to the second UE (e.g., P-UE) may differ from those related to the message transmission from the first UE to a third UE (e.g., another V-UE).

Figure 14:
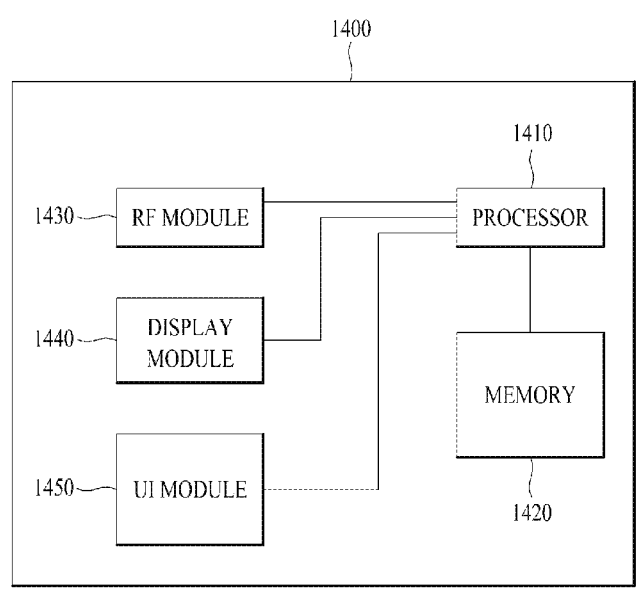
FIG. 14 exemplarily shows a block diagram of a communication device according to one embodiment of the present invention.

FIG. 14 exemplarily shows a block diagram of a communication device according to one embodiment of the present invention.

Referring to FIG. 14, a communication device 1400 includes a processor 1410, a memory 1420, an RF module 1430, a display module 1440 and a user interface module 1450.

The communication device 1400 is illustrated for clarity and convenience of description, and some modules can be omitted. The communication device 1400 may further include necessary modules. Some modules in the communication device 1400 may be subdivided. The processor 1410 is configured to perform operations according to an embodiment of the present invention described with reference to the drawings. Particularly, details of the operations of the processor 1410 may refer to the substance disclosed in FIGS. 1 to 13.

The memory 1420 is connected to the processor 1410 and stores operating systems, applications, program code, data and the like. The RF module 1430 is connected to the processor 1410 and performs a function of converting a baseband signal into a radio signal, and vice versa. To this end, the RF module 1430 performs analog conversion, amplification, filtering, frequency upconverting, and vice versa. The display module 1440 is connected to the processor 1410 and displays various informations. The display module 1440 may employ the well-known elements such as LCD (liquid crystal display), LED (light emitting diode), and OLED (organic light emitting diode), by which the display module 1440 is non-limited. The user interface module 1450 is connected to the processor 1410 and may be configured with a combination of well-known user interfaces such as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, an embodiment of the present invention may be implemented by combining elements and/or features together in part. A sequence of operations explained for each embodiment of the present invention may be modifiable. Some configurations or features of one embodiment may be included in another embodiment or substituted with corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks other than the base station. 'Base station (BS)' may be substituted with such a terminology as a fixed station, a Node B, an eNode B (eNB), an access point (AP) and the like.

In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

It will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although an example of applying a method of transmitting and receiving a signal in a vehicular communication system and an apparatus therefor to a 3GPP LTE system is described, the present invention is applicable to various wireless communication systems in addition to the 3GPP LTE system.

What is claimed is:

1. A method of performing D2D (device-to-device) communication with a second user equipment by a first user equipment in a wireless communication system, the method comprising:
    setting a candidate time interval for receiving a first message containing location information of the second user equipment periodically from the second user equipment as a transmission gap interval; and
    receiving the first message from the second user equipment periodically in the transmission gap interval,
    wherein in the transmission gap interval, a message transmission from the first user equipment is not performed through a candidate carrier for receiving the first message, and
    wherein the transmission gap interval is set based on at least one of location information of the first user equipment or the location information of the second user equipment.

2. The method of claim 1, wherein the first user equipment and the second user equipment comprise a vehicle user equipment (V-UE) and a pedestrian UE (P-UE), respectively.

3. The method of claim 1, wherein in the transmission gap interval, the message transmission from the first user equipment is not performed through the candidate carrier and a carrier adjacent to the candidate carrier.

4. The method of claim 3, wherein the carrier adjacent to the candidate carrier comprises either at least one carrier spaced apart from the candidate carrier by a value equal to or smaller than a specific value or at least one carrier belonging to a same frequency band of the candidate carrier.

5. The method of claim 1, wherein the first message further comprises at least one of information of a reception carrier the second user equipment attempts to receive, information of a reception radio resource the second user equipment attempts to receive, or reception synchronization information of the second user equipment.

6. The method of claim 5, further comprising:
    detecting a dangerous situation of the second user equipment based on the location information of the second user equipment; and
    if the dangerous situation of the second user equipment is detected, transmitting a warning message to the second user equipment,
    wherein the warning message is transmitted based on at least one of the information of the reception carrier, the information of the reception radio resource, or the reception synchronization information.

7. The method of claim 5, wherein the information of the reception radio resource comprises at least one of specific time region information, specific frequency region information, or index information indicating a specific radio resource among a plurality of radio resources.

8. The method of claim 5, wherein the reception synchronization information comprises information of a specific cell synchronized with the second user equipment or information of a specific GNSS (global navigation satellite system) synchronized with the second user equipment.

9. A first user equipment configured to perform D2D (device-to-device) communication with a second user equipment in a wireless communication system, the first user equipment comprising:
    a transceiver;
    a memory; and
    a processor operatively connected to the transceiver and the memory, the processor configured to:
        set a candidate time interval for receiving a first message containing location information of the second user equipment periodically from the second user equipment as a transmission gap interval; and
        receive the first message from the second user equipment periodically in the transmission gap interval,
        wherein in the transmission gap interval, a message transmission from the first user equipment is not performed through a candidate carrier for receiving the first message, and
        wherein the transmission gap interval is set based on at least one of location information of the first user equipment or the location information of the second user equipment.

* * * * *